W. JAY.
LIQUID SUPPLY GAGE.
APPLICATION FILED OCT. 21, 1916. RENEWED NOV. 9, 1917.

1,251,668.

Patented Jan. 1, 1918.

Witness:
O. H. Huntia

Inventor:
Webb Jay,
by Burton & Burton
his Attys

UNITED STATES PATENT OFFICE.

WEBB JAY, OF CHICAGO, ILLINOIS.

LIQUID-SUPPLY GAGE.

1,251,668. Specification of Letters Patent. Patented Jan. 1, 1918.

Application filed October 21, 1916, Serial No. 126,886. Renewed November 9, 1917. Serial No. 201,183.

*To all whom it may concern:*

Be it known that I, WEBB JAY, a citizen of the United States, residing at Chicago, in the county of Cook and State of Illinois, have invented new and useful Improvements in Liquid-Supply Gages, of which the following is a specification, reference being had to the accompanying drawings, forming a part thereof.

The purpose of this invention is to provide a gage device associated with a liquid supply receptacle such as a gasolene tank on an automobile, so arranged that the indicating elements of the gage may be mounted at any convenient location at a distance from the tank itself, and by virtue of connection with said tank will be adapted to indicate the quantity of liquid remaining in the tank at any time while not interfering with the continuous or intermittent withdrawal of such liquid. The invention consists of the various elements contributing in combination to this result, as hereinafter described and illustrated in the drawings and as indicated by the claims.

In the drawings:—

Figure 1:
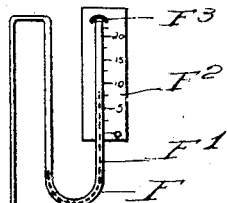
Figure 1 is a diagrammatic view with certain parts in section, showing a gage device embodying this invention.
Figure 1:
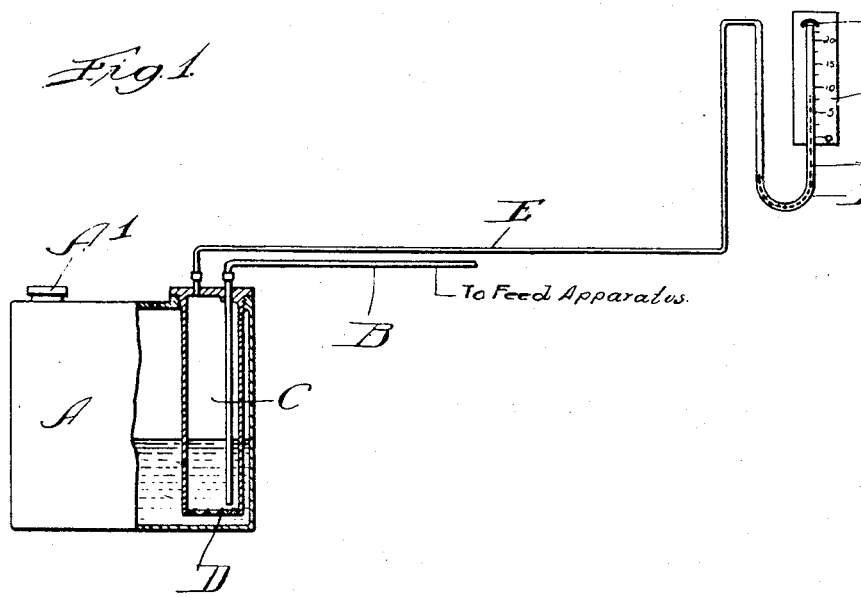

In the drawings the liquid supply receptacle which may be the gasolene tank of an automobile, is represented at A, and is shown provided with the filler cap, $A^1$, through which the gasolene is introduced into the tank and the discharge pipe, B, which may lead to any suitable means for withdrawing the liquid from the tank, A, such as, for example, a suction pump or a vacuum feed mechanism, said tank having the usual atmospheric inlet port, $a$, at the top. Within the tank, A, there is formed a compartment, C, whose bottom wall is a filter screen, D, and the discharge pipe, B, is shown terminating within the compartment, C, just above said filter screen, D, in order that the liquid withdrawn from the tank, A, may be filtered through the screen before it enters the discharge pipe, B. Leading from the top of the compartment, C, a tube, E, extends to the gage device which is shown in Fig. 1, as a U-tube, F, containing a liquid piston, $F^1$, which may be mercury or any other suitable liquid, and having a scale, $F^2$, associated with one limb.

The device operates as follows: Starting with the tank, A, empty and with the filler cap, $A^1$, removed, it will be seen that the tank, A, and the compartment, C, and also tube, E, will contain air at atmospheric pressure. As the gasolene or other liquid is poured into the tank, it will gradually rise in the compartment, C, and expel the air from said compartment, tending to compress it in the upper portion of the compartment and in the tube, E, but in so doing, overbalancing the liquid column, $F^1$, in the U-tube, F, and causing said liquid to rise in the limb of the tube with which the scale, $F^2$, is associated. Said scale, $F^2$, may be properly graduated to indicate the quantity of liquid in the tank, A, corresponding to a given position of the top of the column, $F^1$, in this farther limb of the tube, F, so that as the tank, A, becomes full, said column of liquid will reach a maximum height in the tube. Now as the liquid is withdrawn from the tank, A, through the pipe, B, by means of any suitable apparatus associated with said pipe, B, the level of liquid receding in the tank, A, and likewise in the compartment, C, will permit expansion of the air in the tube, E, with resulting decrease in the pressure of this confined air, and a corresponding fall in the column of liquid in the farther limb of the U-tube, F. Thus by the time all the liquid has been withdrawn from the tank, A, the liquid piston, $F^1$, will have resumed its original position corresponding to the empty condition of the tank, while at any intermediate point, the position of the piston, $F^1$, in the farther limb of the U-tube, F, will indicate the quantity of liquid remaining in the tank, A. It is immaterial whether the limb of the U-tube, F, associated with the scale, $F^2$, be hermetically sealed or be left open to the atmosphere, except that, of course, the graduations of the scale, $F^2$, would be slightly different in the two cases; if the tube is left open to atmospheric pressure, it may be provided with a dust cap, as indicated at $F^3$.

Figure 2:
Fig. 2 is a similarly arranged diagram of a modification.
Figure 2:
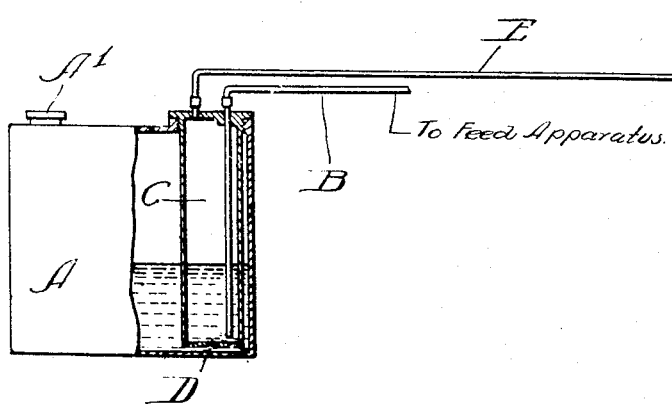

Fig. 2 illustrates a slight modification in which a comparatively sensitive pressure gage, G, is substituted for the U-tube, F, the scale of such gage, G, being graduated to indicate the quantity of liquid in the tank, A, corresponding to any given degree of compression of the confined air in the tube, E.

When this invention is employed in connection with a vacuum feed system, which, as is well understood, withdraws liquid intermittently from the tank, A, and stores it in a small auxiliary tank, the presence of the filter screen, D, will render the gage device, whether in the form, F, or in the form, G, capable of indicating the operation of the vacuum feed system. Owing to the presence of the screen, D, the liquid will be more readily withdrawn from the compartment, C, so that the level in this compartment will be lowered faster than the general level in the tank, A, while withdrawal is taking place, with a subsequent re-adjustment of level through the screen, D. This will cause something of a fluctution in the indication of the gage device which fluctuation will serve to indicate whether or not the vacuum feed mechanism is working properly.

I claim:—

1. In combination with a liquid supply receptacle having an atmosphere inlet at the upper part; a fitting inserted down through the top of the receptacle, and having a screened intake mouth at its lower end; a liquid discharge tube extending air tight through the top of said fitting, and down within the same and open at the lower part for liquid intake; an air tube connected to the top of the fitting and a pressure gage to which said tube leads.

2. In combination with a liquid supply receptacle having an atmosphere inlet at the upper part; a tube having its upper end closed except as to connections hereinafter mentioned, inserted through the top of said receptacle, and having its lower end in said receptacle open for liquid intake and provided with a screen or strainer; an air tube connected to the closed top of said first mentioned tube outside the liquid receptacle; a pressure gage device to which said air tube leads, and a liquid discharge tube extending down air-tight through said top of the first mentioned tube, and at its lower end opening within said first mentioned tube near the lower part thereof above the screen.

3. In combination with a liquid supply receptacle having an atmosphere inlet at the upper part; a fitting inserted down through the top of the receptacle, extending near to the bottom of the receptacle and open at the lower end for liquid intake; a liquid discharge tube extending air-tight through the top of said fitting, and down within the same, and open at the lower part for liquid intake; an air tube connected to the top of the fitting, and a pressure gage to which said tube leads.

In testimony whereof I have hereunto set my hand at Chicago, Illinois, this 19th day of October, 1916.

WEBB JAY.